US012759494B2

(12) United States Patent
Lowak et al.

(10) Patent No.: US 12,759,494 B2
(45) Date of Patent: Oct. 13, 2026

(54) BUMPER ASSEMBLY WITH A CONNECTING DEVICE BETWEEN A DEFORMATION ELEMENT AND A CROSS MEMBER, AND MOTOR VEHICLE

(71) Applicant: AUDI AG, Ingolstadt (DE)

(72) Inventors: Heiko Lowak, Buchen-Waldhausen (DE); Federico Rafanelli, Bad Friedrichshall (DE)

(73) Assignee: AUDI AG, Ingolstadt (DE)

( * ) Notice: Subject to any disclaimer, the term of this patent is extended or adjusted under 35 U.S.C. 154(b) by 428 days.

(21) Appl. No.: 18/491,881

(22) Filed: Oct. 23, 2023

(65) Prior Publication Data

US 2024/0132007 A1 Apr. 25, 2024
US 2024/0227711 A9 Jul. 11, 2024

(30) Foreign Application Priority Data

Oct. 25, 2022 (DE) ........................ 102022128172.8

(51) Int. Cl.
*B60R 19/34* (2006.01)
*B60R 19/24* (2006.01)

(52) U.S. Cl.
CPC .............. *B60R 19/34* (2013.01); *B60R 19/24* (2013.01)

(58) Field of Classification Search
CPC ...................................................... B60R 19/24
See application file for complete search history.

(56) References Cited

U.S. PATENT DOCUMENTS 6,042,163 A * 3/2000 Reiffer .................... B60R 19/18 293/154
6,918,621 B2 * 7/2005 Seksaria ................. B60R 19/34 293/133
2018/0170294 A1 * 6/2018 Hashimoto ............. B60R 19/24
2021/0053519 A1 * 2/2021 Karlsson ................. B60R 19/34

FOREIGN PATENT DOCUMENTS

DE 19603953 C1 * 4/1997 ............. B62D 21/15
DE 19533366 C2 * 3/1998 ............. B62D 21/15
DE 202009005718 U1 7/2009
DE 102015115741 A1 * 3/2017 ............. B60R 19/24
GB 2299551 A 10/1996
JP H0332447 Y2 * 7/1991

OTHER PUBLICATIONS

"T-Piece Ground for Welding", Hoerr-Edelstahl, 4 pages.
(Continued)

*Primary Examiner* — Robert E Fuller
(74) *Attorney, Agent, or Firm* — Maier & Maier, PLLC

(57) ABSTRACT

A bumper assembly for a motor vehicle, having a deformation element which is coupled to a cross member of the bumper assembly. In a mounted position of the bumper assembly in the motor vehicle, the deformation element is arranged between a longitudinal member of the motor vehicle and the cross member. The bumper assembly has a connecting device with a first hollow profile region, in which an end region of the deformation element is received. The connecting device has a second hollow profile region, in which a partial region of the cross member is received.

15 Claims, 2 Drawing Sheets

(56) References Cited

OTHER PUBLICATIONS

“Carport”, Suki, 4 pages.
Simon, “Material-appropriate construction and design with metallic materials”, Habilitation thesis submitted to the Faculty of Mechanical Engineering, Electrical Engineering and Industrial Engineering at the Brandenburg University of Technology, Feb. 3, 2005, 10 pages.
Examination Report issued on Sep. 8, 2023, in corresponding German Application No. 102022128172.8, 10 pages.

* cited by examiner

BUMPER ASSEMBLY WITH A CONNECTING DEVICE BETWEEN A DEFORMATION ELEMENT AND A CROSS MEMBER, AND MOTOR VEHICLE

FIELD

The invention relates to a bumper assembly for a motor vehicle, with a deformation element which is coupled to a cross member of the bumper assembly. In an installed position of the bumper assembly in the motor vehicle, the deformation element is arranged between a longitudinal member of the motor vehicle and the cross member. Furthermore, the invention also relates to a motor vehicle having such a bumper assembly.

BACKGROUND

Deformation elements, which are arranged between the longitudinal members of a motor vehicle and a cross member of the motor vehicle, and which serve to reduce kinetic energy through deformation in the event of an accident-related application of force, are also referred to as crash boxes. Such a crash box can be connected to the cross member by welding. Herein, there is a direct butt joint between the walls of the crash box and the cross member, at which the crash box is welded to the cross member, wherein a corresponding weld seam is formed all around the crash box.

The disadvantage in this case is the fact that heat input into regions of the welded connection adjacent to the weld seam can lead to the formation of cracks in the event of higher mechanical stress, such as the application of force due to an accident. This in turn can lead to a crash management system (CMS) of the motor vehicle, which includes the crash boxes and the cross member, losing its integrity. The latter is undesirable because the crash management system then no longer fulfills its task of specifically reducing kinetic energy to the desired extent.

It therefore makes sense to provide a measure for local stiffening in the region of the coupling of a deformation element or a crash box with a cross member of a bumper assembly or such a crash management system.

DE 20 2009 005 718 U1 describes a profile connector for connecting rod-shaped elements around corners. Such a profile connector can be used, for example, for the production of frame structures, for example to couple tent poles of a tent to one another. Profile connectors that can withstand high mechanical loads can be designed as metal profiles.

SUMMARY

The object of the present invention is to create a bumper assembly of the type mentioned at the outset, in which a particularly resilient coupling is formed between the deformation element and the cross member, and to provide a motor vehicle with at least one such bumper assembly.

The bumper assembly for a motor vehicle according to the invention comprises a deformation element which is coupled to a cross member of the bumper assembly. In a mounted position of the bumper assembly in the motor vehicle, the deformation element is arranged between a longitudinal member of the motor vehicle and the cross member. The bumper assembly has a connecting device with a first hollow profile region in which an end region of the deformation element is received. The connecting device has a second hollow profile region in which a partial region of the cross member is received.

Accordingly, the connecting device, in which the end region of the deformation element is shoed into the first hollow profile region, and in which the partial region of the cross member is shoed into the second hollow profile region, ensures a particularly resilient coupling between the deformation element and the cross member. For example, mechanical stresses, which can result from an accident-related application of force to the bumper assembly, are absorbed or distributed by the connecting device, in particular distributed over a large region.

If, on the other hand, the deformation element were connected directly to the cross member by means of a weld seam, the mechanical stresses would occur almost exclusively in the region of the weld seam. However, particularly in the region of a heat-affected zone of the weld seam, there may be a weak point which, in the event of an accident-related application of force or in a crash test, can lead to the deformation element or the crash box being undesirably torn off from the cross member. This is substantially avoided in the present case, since the deformation element or the crash box is coupled to the cross member via the connecting device.

And by arranging the end region of the deformation element in the first hollow profile region of the connecting device and the partial region of the cross member in the second hollow profile region of the connecting device, a particularly large-surface coupling of the deformation element or the crash box with the cross member can be achieved.

This is particularly advantageous because, for example, in the event of an accident-related force being applied to the bumper assembly, the integrity of the bumper assembly can be ensured to a very high degree. A tearing of the deformation element or the crash box from the cross member can therefore be avoided to a particularly large extent. This means that the cohesion or connection of the components of the bumper assembly remains intact. As a result, the bumper assembly can fulfill to a particularly high degree its function of causing a targeted reduction of kinetic energy or impact energy in the event of an accident-related application of force or in a crash test or the like.

The bumper assembly thus provides an improved crash management system of the motor vehicle or for the motor vehicle. This is due in particular to the fact that the multi-functional connecting device provides local stiffening in the region of the coupling of the deformation element to the cross member.

Preferably, the second hollow profile region is designed as a passage opening of the connecting device, through which a free end of the cross member is passed. Here, the free end of the cross member protrudes beyond the second hollow profile region in the longitudinal extension direction of the cross member. In this way, a particularly large-surface enclosure of the cross member is realized in the second hollow profile region or by means of the second hollow profile region of the connecting device. This makes it possible to absorb a high load in the second hollow profile region.

The connecting device preferably comprises at least one support element, by means of which the hollow profile regions are supported on one another. By providing the at least one support element, the connecting device itself can be locally stiffened in a very targeted manner.

Such support elements can be arranged in particular where, depending on the mechanical loads, particularly high mechanical stresses occur, for example in the event of an accident-related application of force or as part of a crash test. By providing the at least one support element, it can advantageously be ensured that even such high mechanical stresses do not lead to an impairment of the integrity of the bumper assembly or of the crash management system.

It is particularly simple if the at least one support element is designed as a support wall, the narrow sides of which rest on respective walls of the hollow profile regions or merge into the walls.

Preferably, axial directions of the hollow profile regions of the connecting device are aligned essentially perpendicular to one another. In this way, the loads that occur when force is applied can be absorbed and distributed very well in the region of the connecting device.

The connecting device can in particular be designed in one piece, for example as a casting, which is made of an aluminum alloy and/or steel. Particularly when the connecting device is designed as such a cast part, wall thicknesses of the connecting device can be very easily specified in a targeted manner in a way that is advantageous with regard to possible loads that may occur on the connecting device in the bumper assembly.

Additionally or alternatively, the connecting device can be formed from a fiber-reinforced plastic material or have a fiber-reinforced plastic material. This also makes it possible to realize wall thicknesses of the connecting device according to the requirements. Furthermore, when using fiber-reinforced plastics for the connecting device, a particularly low weight of the connecting device can advantageously be achieved.

Preferably, a width of the first hollow profile region in the longitudinal extension direction of the cross member is less than a width of the second hollow profile region in the longitudinal extension direction of the cross member. Additionally or alternatively, a height of the first hollow profile region in the vertical direction of the cross member can be less than a height of the second hollow profile region in the vertical direction of the cross member. This makes it possible to achieve a particularly good support between the hollow profile regions. In particular, the hollow profile regions can be supported very well against one another by means of at least one support element.

The end region of the deformation element received in the first hollow profile region can rest on the cross member at least in regions. This means that, in the event of an accident-related application of force, a very direct transmission of force can take place from the cross member to the deformation element. This is advantageous, in particular in order to provide a targeted deformation of the deformation element.

Alternatively, it can be provided that the end region of the deformation element received in the first hollow profile region is arranged at a distance from the cross member in the axial direction of the first hollow profile region. In this way, a particularly large deformation path is provided before the deformation element is deformed as a result of the application of force. As a result, a particularly large amount of deformation energy can be dissipated.

A wall of the second hollow profile region facing the end region of the deformation element can have a recess the shape of which corresponds to an inner cross section of the first hollow profile region. This makes it easier to produce the connection device. Furthermore, it can be ensured particularly easily that the end region of the deformation element received in the first hollow profile region rests on the cross member at least in some regions.

However, even if the end region of the deformation element received in the first hollow profile region is arranged at a distance from the cross member in the axial direction of the first hollow profile region, the wall of the second hollow profile region facing the end region of the deformation element can have the recess, the shape of which matches the shape of the inner cross section of the first hollow profile region.

Preferably, the first hollow profile region comprises a plurality of walls, wherein inner sides of the walls of the first hollow profile region rest at least partially on outer sides of the end region of the deformation element. In this way, a very intimate bond between the deformation element with the first hollow profile region can be achieved. This applies in particular when the inner sides of the walls are in contact with the outer sides over a large surface or with their entire surface.

Additionally or alternatively, it is preferably provided that the second hollow profile region comprises a plurality of walls, wherein inner sides of the walls of the second hollow profile region abut at least in regions on outer sides of the partial region of the cross member. In this way, a very intimate, in particular flat or full-surface bonding of the partial region of the cross member with the second hollow profile region can be achieved.

A good connection of the hollow profile regions with the end region of the deformation element and the partial region of the cross member is advantageous for a good spatial distribution of mechanical stresses and for a high load capacity of the coupling between the deformation element and the cross member, which is brought about by the connecting device.

The hollow profile regions can be rectangular in cross section. In this way, a comparatively high rigidity of the hollow profile regions can be achieved easily and with little effort.

The end region of the deformation element can be materially connected and/or screwed to the first hollow profile region. For example, the end region of the deformation element can be welded to the first hollow profile region and/or connected thereto by gluing. The material connection and/or screwing provides a very resilient connection of the deformation element to the first hollow profile region.

Additionally or alternatively, the partial region of the cross member can be materially connected and/or screwed to the second hollow profile region. Here too, welding and/or gluing can be used as a material connection method. The material connection and/or screwing achieves a very resilient connection of the cross member to the second hollow profile region.

The motor vehicle according to the invention has at least one bumper assembly according to the invention. In particular, the deformation element is fixed to a longitudinal member of the motor vehicle. Consequently, the motor vehicle is equipped with at least one crash management system, the integrity of which is guaranteed to a particularly high degree in the event of force application, particularly as a result of an accident.

The advantages and preferred embodiments described for the bumper assembly according to the invention also apply to the motor vehicle according to the invention and vice versa.

The invention also includes developments of the motor vehicle according to the invention, which have features that have already been described in the context of the developments of the bumper assembly according to the invention. For this reason, the corresponding developments of the motor vehicle according to the invention are not described again here.

The motor vehicle according to the invention is preferably designed as an automobile, in particular as a passenger car or truck, or as a passenger bus.

The invention also comprises the combinations of the features of the described embodiments. The invention therefore also comprises implementations that each have a combination of the features of several of the described embodiments, provided that the embodiments have not been described as mutually exclusive.

BRIEF DESCRIPTION OF THE FIGURES

Exemplary embodiments of the invention are described hereinafter. In particular.

DETAILED DESCRIPTION

Figure 1:
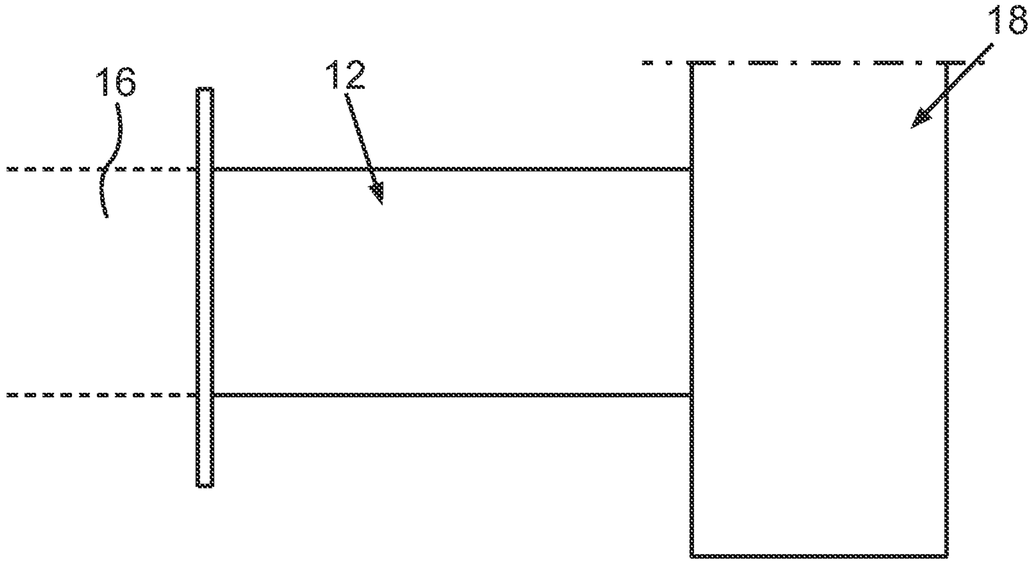
FIG. 1 schematically shows details of components of a bumper assembly, which comprises a cross member and a deformation element designed as a crash box.

The exemplary embodiments explained hereinafter are preferred embodiments of the invention. In the exemplary embodiments, the described components of the embodiments each represent individual features of the invention to be considered independently of one another, which each also develop the invention independently of one another. Therefore, the disclosure is also intended to comprise combinations of the features of the embodiments other than those represented. Furthermore, the described embodiments can also be supplemented by further ones of the above-described features of the invention.

In the figures, same reference numerals respectively designate elements that have the same function.

In FIG. 1, a deformation element 12 is shown in a schematic plan view of a bumper assembly 10 (see FIG. 3), which is also referred to as a crash box. In a mounted position or installed position of the bumper assembly 10 in a motor vehicle 14 shown schematically in FIG. 4, the deformation element 12 is connected to a longitudinal member 16 of the motor vehicle 14. Here, the deformation element 12 is arranged between a cross member 18 of the bumper assembly 10 and the longitudinal member 16. The longitudinal member 16 is shown only schematically and in details in FIG. 1.

In the present case, the deformation element 12 is not connected directly to the cross member 18 via a weld seam. Rather, a connecting device 20 is provided for coupling the deformation element 12 to the cross member 18 (see FIG. 3), which is shown schematically and in perspective in FIG. 2.

Figure 2:
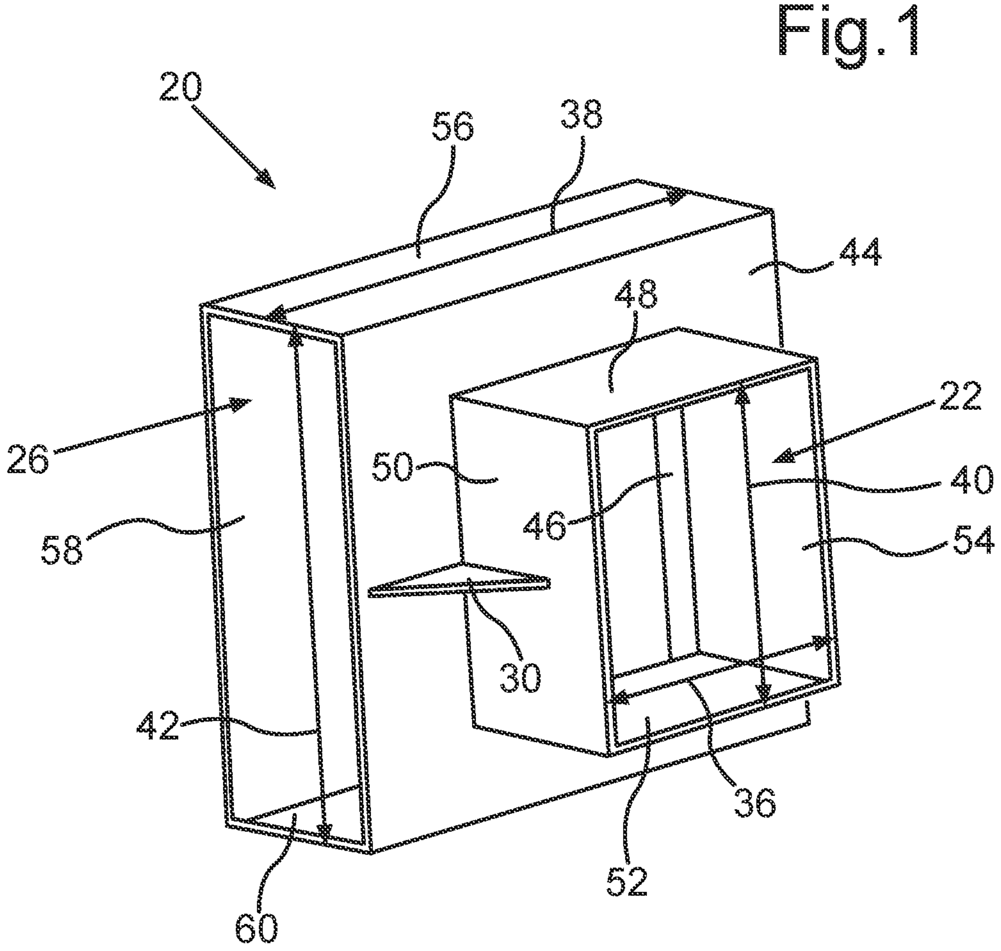
FIG. 2 shows a connecting device via which the deformation element is coupled to the cross member.
Figure 3:
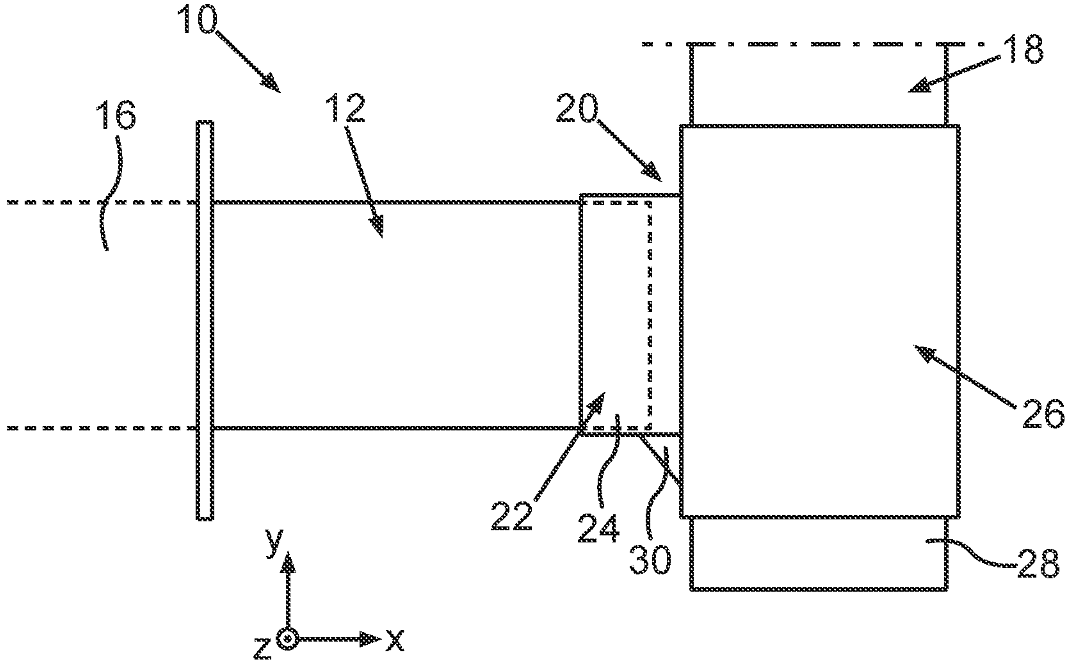
FIG. 3 shows a schematic plan view of the bumper assembly according to FIG. 1, which has the connecting device according to FIG. 2.

According to FIG. 2, the connecting device 20 comprises a first hollow profile region 22, into which an end region 24 of the deformation element 12 is shoed or inserted into (see FIG. 3). Accordingly, the end region 24 of the deformation element 12 is received in the first hollow profile region 22 or first hollow profile of the connecting device 20.

Furthermore, the connecting device 20 has a second hollow profile region 26, in which a partial region of the cross member 18 is received (see FIG. 3). Accordingly, the cross member 18 is shoed or inserted into the second hollow profile region 26.

The connection between the cross member 18 and the deformation element 12 is therefore not made directly, but rather via the present additional connecting device 20, which can be designed, for example, as a cast part. The connecting device 20 or the multi-functional connecting element ensures local stiffening of the connection or coupling of the deformation element 12 to the cross member 18 in an advantageous and simple manner.

The insertion of the cross member 18 into the second hollow profile region 26 of the connecting device 20 and of the end region 24 of the deformation element 12 into the first hollow profile region 22 of the connecting device 20 ensures that a particularly resilient coupling is produced or formed between the deformation element 12 and the cross member 18. Because in this case, in contrast to a direct connection of the deformation element 12 to the cross member 18 via a weld seam, there is no weak point, such as the one present in a heat-affected zone of the weld seam.

Such a weak point can lead to the deformation element 12 tearing off from the cross member 18 if force is applied due to an accident. This is prevented in the present case. Consequently, in the event of an accident-related application of force, for example, the integrity of the bumper assembly 10 or of such a crash management system of the motor vehicle 14 can be particularly largely maintained or ensured.

In particular from FIG. 3 it can be seen that the second hollow profile region 26 is designed as a passage opening of the connecting device 20, through which a free end 28 of the cross member 18 is passed. Therefore, the free end 28 of the cross member 18 protrudes beyond the second hollow profile region in the longitudinal extension direction of the cross member 18.

In the present case, in the mounted position of the bumper assembly 10 in the motor vehicle 14, the longitudinal extension direction of the cross member 18 is essentially parallel to the direction of a vehicle transverse axis y of the motor vehicle 14. In FIG. 3, the vehicle longitudinal axis x and the vehicle vertical axis z are additionally indicated in a coordinate system, wherein, in the mounted position of the bumper assembly 10 in the motor vehicle 14, these directions are respectively essentially parallel to an axial direction of the first hollow profile region 22 and to a vertical direction of the cross member 18.

From FIG. 2 and FIG. 3 it can be clearly seen that the connecting device 20 can have at least one support element 30, for example in the form of at least one supporting wall, by means of which the hollow profile regions 26, 22 are supported on one another.

For example, the support element 30 can be arranged on a side of the first hollow profile region 22, which is closer to the free end 28 of the cross member 18 than a respective opposite side of the first hollow profile region 22. By means of such a support element 30 designed in the manner of a support wall or rib the connecting device 20 can be specifically reinforced or stiffened where a tensile load acts on the connecting device 20, for example, in the event of an impact of the motor vehicle 14 provided with the bumper assembly 10 against a pole 32 (see FIG. 4).

Figure 4:
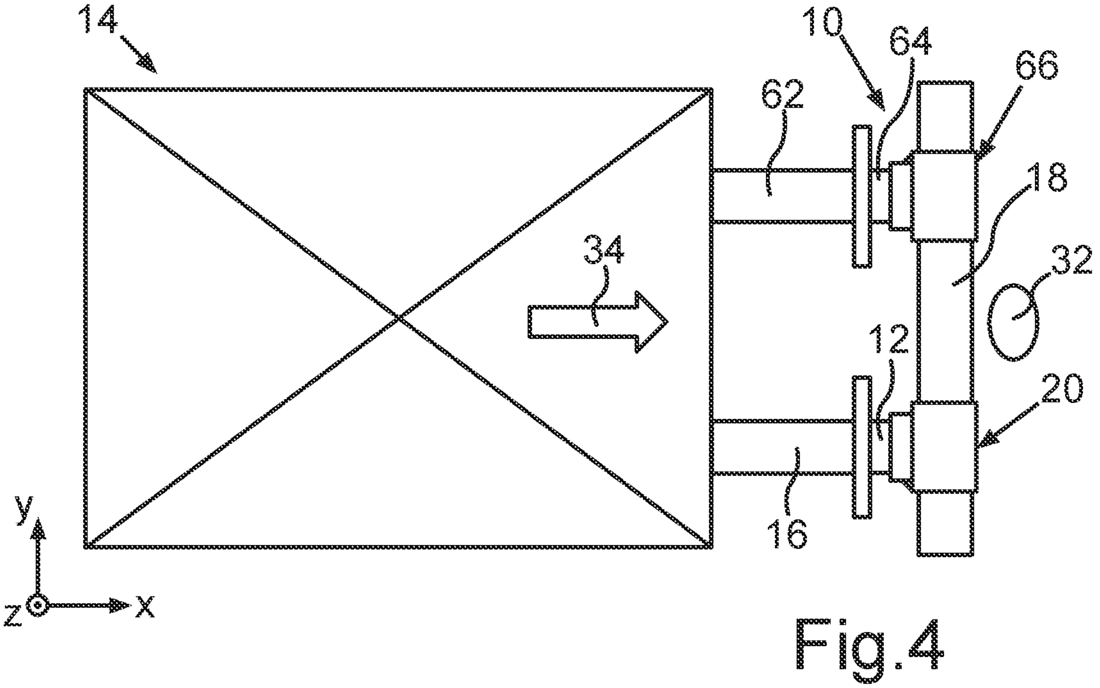
FIG. 4 schematically shows the motor vehicle, in which two crash boxes of the bumper assembly are coupled to the cross member of the bumper assembly via respective connecting devices according to FIG. 2.

During a corresponding crash test to which the motor vehicle 14 can be subjected, the pole 32 is arranged centrally with respect to the vehicle transverse axis y. A direction of travel of the motor vehicle 14 upon impact with the pole 32 is illustrated in FIG. 4 by an arrow 34.

However, the support element 30 of the connecting device 20 shown in FIG. 2 and in FIG. 3 is only to be understood as an example. Such support elements 30 can be provided on the connecting device 20 depending on requirements or load applications, where this is advantageous for local stiffening of the connecting device 20.

For the arrangement of such support elements 30 on the hollow profile regions 22, 26 or chambers of the connecting device 20, it is advantageous if, as shown by way of example in FIG. 2, a width 36 of the first hollow profile region 22 in the longitudinal extension direction of the cross member 18 is less than a width 38 of the second hollow profile region 26 in the longitudinal extension direction of the cross member 18. Furthermore, in the present case, a height 40 of the first hollow profile region 22 in the vertical direction of the cross member 18, namely essentially parallel to the vehicle vertical axis z, is less than a height 42 of the second hollow profile region 26 in the vertical direction of the cross member 18.

From FIG. 3 it can be seen that the end region 24 of the deformation element 12 received in the first hollow profile region 22 can be arranged at a distance from the cross member 18 in the axial direction of the first hollow profile region 22, namely essentially parallel to the direction of the vehicle's longitudinal axis x.

However, it is also possible for the end region 24 of the deformation element 12 to rest on the cross member 18. From FIG. 2 it can be seen in this regard that a wall 44 of the second hollow profile region 26 facing the end region 24 of the deformation element 12 can have a recess 46, the shape of which corresponds to an inner cross section of the first hollow profile region 22.

In the present case, the first hollow profile region 22 comprises a plurality of walls 48, 50, 52, 54, the inner sides of which rest on outer sides of the end region 24 of the deformation element 12. In an analogous manner, the second hollow profile region 26 comprises a plurality of walls 44, 56, 58, 60, which, like the walls 48, 50, 52, 54 of the first hollow profile region 22, in the present case form a substantially box-shaped, rectangular profile. The insides of the walls 44, 56, 58, 60 of the second hollow profile region 26 preferably lie on outer sides of the partial region of cross member 18, which is enclosed by the second hollow profile region 26. In this way, an intimate connection of the cross member 18 and the end region 24 of the deformation element 12 with the respective hollow profile region 22, 26 can be achieved very well.

From FIG. 4 it can be clearly seen that in the region of a further longitudinal member 62 of the motor vehicle 14, a further deformation element 64 arranged there is also coupled via a further connecting device 66 to the cross member 18 of the bumper assembly 10 or bumper arrangement. This further or second connecting device 66 is constructed analogously to the other or first connecting device 20. Therefore, in this regard, reference is made to the explanations for the first connecting device 20 shown in FIG. 2.

Overall, the examples show how a connecting device 20, designed in particular as a cast part, can be provided between the deformation element 12 or the crash box and the cross member 18 of the crash management system, in the present case in the form of the bumper assembly 10.

The invention claimed is:

1. A bumper assembly for a motor vehicle, comprising: a deformation element, which is coupled to a cross member of the bumper assembly, wherein, when the bumper assembly is mounted in the motor vehicle, the deformation element is arranged between a longitudinal member of the motor vehicle and the cross member, wherein the bumper assembly has a connecting device having a first hollow profile region in which an end region of the deformation element is received, wherein the connecting device has a second hollow profile region, in which a partial region of the cross member is received, wherein the second hollow profile region is a passage opening of the connecting device, through which a free end of the cross member is passed, and wherein the free end of the cross member protrudes beyond the second hollow profile region in the longitudinal extension direction of the cross member.

2. The bumper assembly according to claim 1, wherein the connecting device comprises at least one support element, in particular designed as a support wall, by which the hollow profile regions are supported on one another.

3. The bumper assembly according to claim 2, wherein an axial direction of the first hollow profile region is perpendicular to an axial direction of the second hollow profile region.

4. The bumper assembly according to claim 2, wherein a width of the first hollow profile region in the longitudinal extension direction of the cross member is less than a width of the second hollow profile region in the longitudinal extension direction of the cross member and/or a height of the first hollow profile region in the vertical direction of the cross member is less than a height of the second hollow profile region in the vertical direction of the cross member.

5. The bumper assembly according to claim 2, wherein the end region of the deformation element received in the first hollow profile region rests at least partially on the cross member or the end region of the deformation element received in the first hollow profile region is arranged at a distance from the cross member in the axial direction of the first hollow profile region.

6. The bumper assembly according to claim 1, wherein an axial direction of the first hollow profile region is perpendicular to an axial direction of the second hollow profile region.

7. The bumper assembly according to claim 6, wherein a width of the first hollow profile region in the longitudinal extension direction of the cross member is less than a width of the second hollow profile region in the longitudinal extension direction of the cross member and/or a height of the first hollow profile region in the vertical direction of the cross member is less than a height of the second hollow profile region in the vertical direction of the cross member.

8. The bumper assembly according to claim 6, wherein the end region of the deformation element received in the first hollow profile region rests at least partially on the cross member or the end region of the deformation element received in the first hollow profile region is arranged at a distance from the cross member in the axial direction of the first hollow profile region.

9. The bumper assembly according to claim 1, wherein a width of the first hollow profile region in the longitudinal extension direction of the cross member is less than a width of the second hollow profile region in the longitudinal extension direction of the cross member and/or a height of the first hollow profile region in the vertical direction of the cross member is less than a height of the second hollow profile region in the vertical direction of the cross member.

10. The bumper assembly according to claim 9, wherein the end region of the deformation element received in the first hollow profile region rests at least partially on the cross member or the end region of the deformation element received in the first hollow profile region is arranged at a distance from the cross member in the axial direction of the first hollow profile region.

11. The bumper assembly according to claim 1, wherein the end region of the deformation element received in the first hollow profile region rests at least partially on the cross member or the end region of the deformation element received in the first hollow profile region is arranged at a distance from the cross member in the axial direction of the first hollow profile region.

12. The bumper assembly according to claim 1, wherein a wall of the second hollow profile region has a recess, the recess having a shape corresponding to an inner cross section of the first hollow profile region.

13. The bumper assembly according to claim 1, wherein the first hollow profile region comprises a plurality of walls, wherein the inner sides of the walls of the first hollow profile region rest at least in regions on outer sides of the end region of the deformation element and/or the second hollow profile region comprises a plurality of walls, wherein the inner sides of the walls of the second hollow profile region rest at least in regions on outer sides of the partial region of the cross member.

14. The bumper assembly according to claim 1, wherein the end region of the deformation element is materially connected and/or screwed to the first hollow profile region, wherein the partial region of the cross member is materially connected and/or screwed to the second hollow profile region.

15. A motor vehicle with at least one bumper assembly according to claim 1, wherein the deformation element is fixed to a longitudinal member of the motor vehicle.

* * * * *